US009374707B2

(12) United States Patent
Kruglick (10) Patent No.: US 9,374,707 B2
(45) Date of Patent: Jun. 21, 2016

(54) SECURE CONNECTION FOR WIRELESS DEVICES VIA NETWORK RECORDS (71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/372,008

(22) PCT Filed: Oct. 25, 2013

(86) PCT No.: PCT/US2013/066919
§ 371 (c)(1),
(2) Date: Jul. 11, 2014

(87) PCT Pub. No.: WO2015/060876
PCT Pub. Date: Apr. 30, 2015

(65) Prior Publication Data
US 2015/0350900 A1 Dec. 3, 2015

(51) Int. Cl.
*H04L 9/32* (2006.01)
*H04W 12/06* (2009.01)
*H04L 29/06* (2006.01)
*H04W 12/04* (2009.01)
*H04W 12/08* (2009.01)
*H04W 76/02* (2009.01)

(52) U.S. Cl.
CPC .............. *H04W 12/06* (2013.01); *H04L 9/3236* (2013.01); *H04L 9/3273* (2013.01); *H04L 9/3297* (2013.01); *H04L 63/101* (2013.01); *H04L 2209/80* (2013.01); *H04W 12/04* (2013.01); *H04W 12/08* (2013.01); *H04W 76/023* (2013.01)

(58) Field of Classification Search
None
See application file for complete search history.

(56) References Cited

U.S. PATENT DOCUMENTS

| 5,764,887 A | 6/1998 | Kells et al. |
|---|---|---|
| 8,265,632 B2 | 9/2012 | Kitahara |
| 2006/0094401 A1 | 5/2006 | Eastlake, III |

(Continued)

OTHER PUBLICATIONS

Cheung, H., "How To: Building a BlueSniper Rifle—Part 1," Accessed at http://web.archive.org/web/20130818010516/http://www.tomsguide.com/us/how-to-bluesniper-pt1,review-408.html, accessed on Jul. 10, 2014, pp. 5.

(Continued)

*Primary Examiner* — Brandon Hoffman
(74) *Attorney, Agent, or Firm* — Turk IP Law, LLC (57) ABSTRACT

Technologies are generally described for a system to establish a secure connection between a wireless device and another device or a recognized service using device network records. According to some examples, the wireless device may send an authentication request to initiate a communication session with another wireless or a recognized service. The authentication request may be encrypted with a first secret, or a hash, synthesized by the device based on the network records associated with the device. The device may be authenticated using the network's copy of the network records. The network may similarly authenticate the identity of the recognized service or other device. The network may synthesize a second secret based on the network records, and may provide the second secret to the recognized service or other device to enable a communication session secured by the second secret.

20 Claims, 6 Drawing Sheets

(56) References Cited

U.S. PATENT DOCUMENTS

| | | | |
|---|---|---|---|
| 2007/0136589 A1* | 6/2007 | Magdi | H04L 9/3271 713/171 |
| 2007/0162961 A1 | 7/2007 | Tarrance et al. | |
| 2007/0190944 A1 | 8/2007 | Doan et al. | |
| 2010/0099417 A1 | 4/2010 | Cho | |
| 2013/0246199 A1 | 9/2013 | Carlson | |
| 2014/0095873 A1* | 4/2014 | Mulla | H04L 63/0807 713/168 |

OTHER PUBLICATIONS

Cheng, S-T. and Lin, J-L., "IPv6-based Dynamic Coordinated Call Admission Control Mechanism over Integrated Wireless Networks." IEEE Journal on Selected Areas in Communications, vol. 23, No. 11, pp. 2093-2103 Nov. 2005.

Federica, V. et al., "Admission Control for LTE-Advanced Relay Systems," EW. 18th European Wireless Conference, European Wireless, Apr. 2012, pp. 1-8.

International Search Report for International Patent Application No. PCT/US2013/66919 mailed May 2, 2014.

Jeon, W. S. and Jeong, D. G., "Call Admission Control for CDMA Mobile Communications Systems Supporting Multimedia Services." IEEE Transactions on Wireless Communications, vol. 1, No. 4, pp. 649-659 (2002).

Kim, H. and Shin, K. G., "Optimal admission and eviction control of secondary users at cognitive radio HotSpots," SECON'09 Proceedings of the 6th Annual IEEE communications society conference on Sensor, Mesh and Ad Hoc Communications and Networks, pp. 198-206, Jun. 2009.

Mitnick, K., "2-Day Social Engineering Training Course Outline," Mitnick Security Consulting, LLC, p. 4 (2004).

Perros, H. G, and Elsayed, K. M., "Call Admission Control Schemes: a Review," IEEE Communications Magazine, vol. 34, No. 11, pp. 82-91 (1996).

\* cited by examiner

COMPUTER PROGRAM PRODUCT 600

SIGNAL-BEARING MEDIUM 602

604 AT LEAST ONE OF

ONE OR MORE INSTRUCTIONS FOR RECEIVING AUTHENTICATION REQUEST AS ENCRYPTED SECRET BASED ON NETWORK RECORDS FROM DEVICE TO INITIATE SECURE COMMUNICATION SESSION WITH ONE OF: $2^{ND}$ DEVICE OR RECOGNIZED SERVICE;

ONE OR MORE INSTRUCTIONS FOR AUTHENTICATING DEVICE BASED ON CONFIRMATION OF NETWORK RECORDS;

ONE OR MORE INSTRUCTIONS FOR PROVIDING AUTHENTICATED REQUEST TO ONE OF: $2^{ND}$ NETWORK ASSOCIATED WITH $2^{ND}$ DEVICE OR RECOGNIZED SERVICE;

ONE OR MORE INSTRUCTIONS FOR AUTHENTICATING ONE OF: $2^{ND}$ DEVICE OR RECOGNIZED SERVICE;

ONE OR MORE INSTRUCTIONS FOR SHARING $2^{ND}$ SECRET BETWEEN DEVICE AND ONE OF: $2^{ND}$ DEVICE OR RECOGNIZED SERVICE; AND/OR

ONE OR MORE INSTRUCTIONS FOR ESTABLISHING SECURE CONNECTION OVER CHANNEL SECURED BY $2^{ND}$ SECRET.

| COMPUTER-READABLE MEDIUM 606 | RECORDABLE MEDIUM 608 | COMMUNICATIONS MEDIUM 610 |

FIG. 6

SECURE CONNECTION FOR WIRELESS DEVICES VIA NETWORK RECORDS

This Application is the National Stage filing under 35 U.S.C. §371 of PCT Application Ser. No. PCT/US13/66919 filed on Oct. 25, 2013. The PCT application is hereby incorporated by reference in its entirety.

BACKGROUND

Unless otherwise indicated herein, the materials described in this section are not prior art to the claims in the present application and are not admitted to be prior art by inclusion in this section.

Typically, a mobile communication device user has the freedom to choose and install software applications, allowing for the customization of the user's mobile communication device. Moreover, operating a mobile device requires little technical skills by the user. Hence, there may be inherent susceptibility of the mobile devices to vulnerabilities, malware, threats, and threat agents. Additionally, unlike desktop computers that can operate complex security software, mobile communication devices generally lack the processing power and resources for effectively running analogous software.

Security measures found in the server and desktop domains may not generally translate well to mobile devices, since mobile devices are typically resource-limited and generally designed to be appliance-like, with heavily enforced boundaries between the underlying system and user. Users generally operate mobile devices in an impromptu manner and the user may have little perspective on the security of their data, as well. Due to the manner of operation, transfer of information security tools from traditional computing domains to mobile devices may often be difficult. To effectively manage the aforementioned security issues, a universal, secure, and user-friendly method of data transmission between a network and the mobile device may be valuable.

SUMMARY

The present disclosure generally describes, inter alia, establishment of a secure connection between a wireless device and another wireless device or a recognized service using wireless device network records.

According to some examples, the present disclosure may describe a method to establish a secure connection for a wireless device using wireless device network records. The method may include receiving, at a first network, an authentication request from a first device to initiate a communication session with a second device. The authentication request of the first device may be encrypted with a first secret synthesized by the first device based on one or more network records associated with the first device. The method may additionally include authenticating the first device based on a confirmation of the one or more network records and providing the authenticated request to a second network over a secure communication channel.

According to other examples, the present disclosure may describe a method to establish a secure connection between a wireless device and a recognized service using wireless device network records. The method may include receiving, at a network, an authentication request from a device to initiate a communication session with a recognized service. The authentication request may be encrypted with a first secret synthesized by the device based on one or more network records associated with the device. The method may additionally include authenticating the device based on a confirmation of the one or more network records. The method may include authenticating an identity of the recognized service. The method may additionally include synthesizing a second secret based on the one or more network records. The method may include providing the second secret to the device and the recognized service over a secure communication channel and establishing the requested communication session between the device and the recognized service over a channel secured by the second secret.

According to further examples, the present disclosure may describe a system to establish a secure connection for a wireless device using wireless device network records. The system may include a plurality of base stations of cell towers and a controller of a first network. The controller may be configured to receive an authentication request from a first device to initiate a communication session with a second device. The authentication request may be encrypted with a first secret synthesized by the first device based on one or more network records associated with the first device. The controller may additionally be configured to authenticate the first device based on a confirmation of the one or more network records and provide the authenticated request to a second network associated with the second device over a secure communication channel. The controller may be configured to receive an authenticated reply of the second device from the second network over the secure communication channel and agree on a second secret with the second network. The controller may be configured to establish the requested communication session between the first device and the second device over a channel secured by the second secret.

According to yet other examples, the present disclosure may describe a system to establish a secure connection between a wireless device and a recognized service using wireless device network records. The system may include a plurality of base stations or cell towers and a controller of a network associated with a device. The controller may be configured to receive an authentication request from the device to initiate a communication session with a recognized service. The authentication request may be encrypted with a first secret synthesized by the device based on one or more network records associated with the device. The controller may be further configured to authenticate the device based on a confirmation of the one or more network records and authenticate an identity of the recognized service. The controller may be further configured to synthesize a second secret based on the one or more network records and provide the second secret to the device and the recognized service over a secure communication channel. The controller may additionally be further configured to establish the requested communication session between the device and the recognized service over a channel secured by the second secret.

According to some examples, the present disclosure may describe a computer-readable storage medium with instructions stored thereon to establish a secure connection for a wireless device using wireless device network records. The present disclosure may also describe a computer-readable storage medium with instructions stored thereon to establish a secure connection between a wireless device and a recognized service using wireless device network records.

The foregoing summary is merely illustrative and is not intended to be in any way limiting. In addition to the illustrative aspects, examples, and features described above, further aspects, examples, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. A person having ordinary skill in the art may readily understand that the aspects of the present disclosure, as generally described herein, and illustrated in the Figures, can be arranged, substituted, combined, separated, and designed in a wide variety of different configurations, all of which may be explicitly contemplated herein.

Generally, program modules include routines, programs, components, data structures, and other types of structures that perform particular tasks or implement particular abstract data types. Moreover, those skilled in the art will appreciate that examples may be practiced with other computer system configurations, including hand-held devices, multiprocessor systems, microprocessor-based or programmable consumer electronics including gaming consoles, minicomputers, mainframe computers, and comparable computing devices. Examples may also be practiced in distributed computing environments where tasks may be performed by remote processing devices that may be linked through a communications network. In a distributed computing environment, program modules may be located in both local and remote memory storage devices.

Examples may be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example processes. The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

The present disclosure is generally drawn, inter alia, to methods, systems, and computer-readable storage mediums to establish a secure connection between a wireless device and another wireless device or recognized service using wireless device network records.

Briefly stated, technologies are generally described for a system to establish a secure connection between a wireless device and another wireless device or a recognized service using device network records. According to some examples, the wireless device may send an authentication request to initiate a communication session with another wireless or a recognized service. The authentication request may be encrypted with a first secret, or a hash, synthesized by the device based on the network records associated with the device. The device may be authenticated using the network's copy of the network records. The network may similarly authenticate the identity of the recognized service or other device. The network may synthesize a second secret based on the network records, and may provide the second secret to the recognized service or other device to enable a communication session secured by the second secret.

A datacenter as used herein refers to an entity that hosts services and applications for customers through one or more physical server installations and one or more virtual machines executed in those server installations. Customers of the datacenter, also referred to as tenants, may be organizations that provide access to their services by multiple users. An example datacenter based service configuration may include an online retail service that provides retail sale services to consumers (users). The retail service may employ multiple applications (e.g., presentation of retail goods, purchase management, shipping management, inventory management, etc.), which may be hosted by one or more datacenters. A consumer may communicate with those applications of the retail service through a client application such as a browser over one or more networks and receive the provided service without realizing where the individual applications may be actually executed. The scenario contrasts with predictable configurations, where each service provider would execute their applications and have their users access those applications on the retail services own servers physically located on retail service premises.

Figure 1:
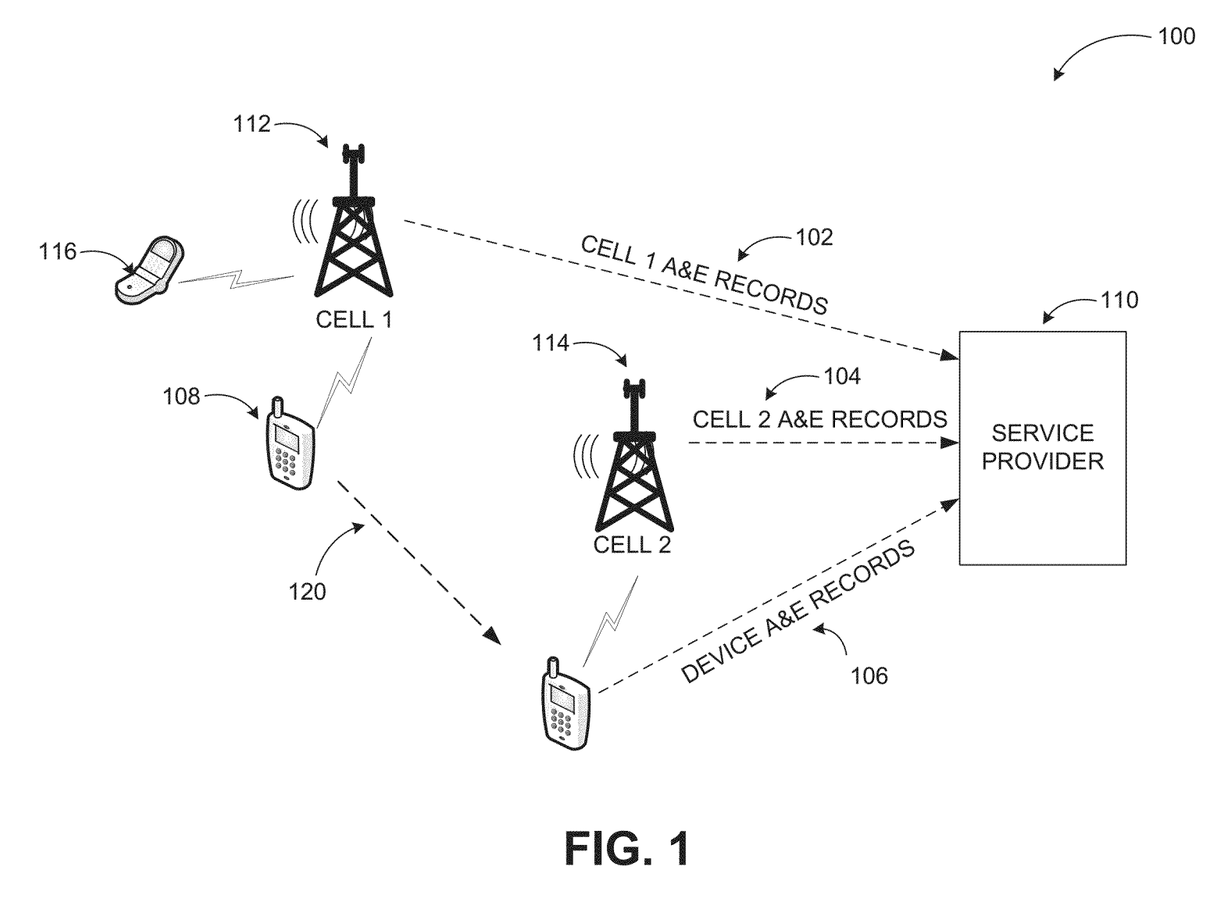
FIG. 1 illustrates an example network where device records are exchanged.

FIG. 1 illustrates an example network where device records are exchanged, arranged in accordance with at least some embodiments as described herein.

In a system according to various embodiments described herein, a wireless device such as a cellular device may establish a secure connection with another wireless device and/or a recognized third party service employing a unique set of network records. As illustrated in a diagram 100, a network, such as a cellular or mobile network, may be distributed over land areas or cells, and each cell may include at least one fixed-location transceiver or tower (e.g. cells 112, 114) generally known as a cell site or base station. Together, the cells provide network coverage over a wide geographic area. In the network, each cell enables portable devices, such as a wireless device 108 or a mobile device 116, to connect to a service provider's network, and to communicate with each other. As the wireless device 108 moves 120 through an area during an ongoing continuous communication, the wireless device may connect to more than one cell (e.g., cells 112, 114) during communication. The wireless device 108 may switch from one cell to a different cell without interruption and without a base station operator or manual switching, in an automatic and seamless handoff.

Network records may maintain or keep track of wireless devices as the devices move through the network and connect to different cells within the network. The network records may include a set of admission and eviction records. Admission records may be generated when a wireless device is turned on and initially connects to the service provider's network, as well as when the device subsequently connects to new cells within the network. Eviction records may be generated when the wireless device is turned off and when the device is dropped by a cell due to signal loss or as the device leaves the cell or is handed off to a new cell. In an example scenario, as a wireless device moves as a result of a drive from a first location to a second location, the wireless device may move in and out of range of a multitude of cells along the route, and may generate a unique set of admission and eviction records as the wireless device 108 is handed off from one cell tower to another.

The wireless device 108 may store the unique set of admission and eviction records 106 locally on the wireless device, and each cell 112, 114 of the network may also generate its own set of admission and eviction records 102, 104 for a multitude of wireless devices that connect to and disconnect from the cell tower. Each cell 112, 114 may transmit its set of admission and eviction records 102, 104 to a central datacenter associated with a service provider 110 over a secure channel, where the service provider 110 may collect admission and eviction records for all cell towers within the service provider's network. The collected admission and eviction records 102, 104 for the cells within the service provider's network may enable the service provider 110 to have a duplicate of each wireless device's locally stored admission and eviction records. In an example scenario, as the wireless device 108 powers on and off and moves between cells, the wireless device 108 may create a unique combination of admission and eviction records known to itself and its service provider's central datacenter. Even a second device carried by a same person may have slight differences in antenna orientation and performance that may cause handoffs between cells to differ, such that each device has unique admission and eviction records.

In an example embodiment, because the admission and eviction records are unique for each wireless device and the admission and eviction records are established via secure connections, the admission and eviction records may be a secure way to create a shared secret to establish a secure data connection. For example, the wireless device may establish a secure connection with the wireless device's service provider 110 using a shared secret generated from the admission and eviction records 106 for the wireless device. Subsequently, a secure connection may be established with another wireless device and/or with a recognized service, such as a bank account, email account, or online shopping account, using a second secret generated from the admission and eviction records. The second secret may be provided to the other wireless device and/or the recognized service over a secure connection such that the shared secret may be protected by not sharing over an insecure connection.

Figure 2:
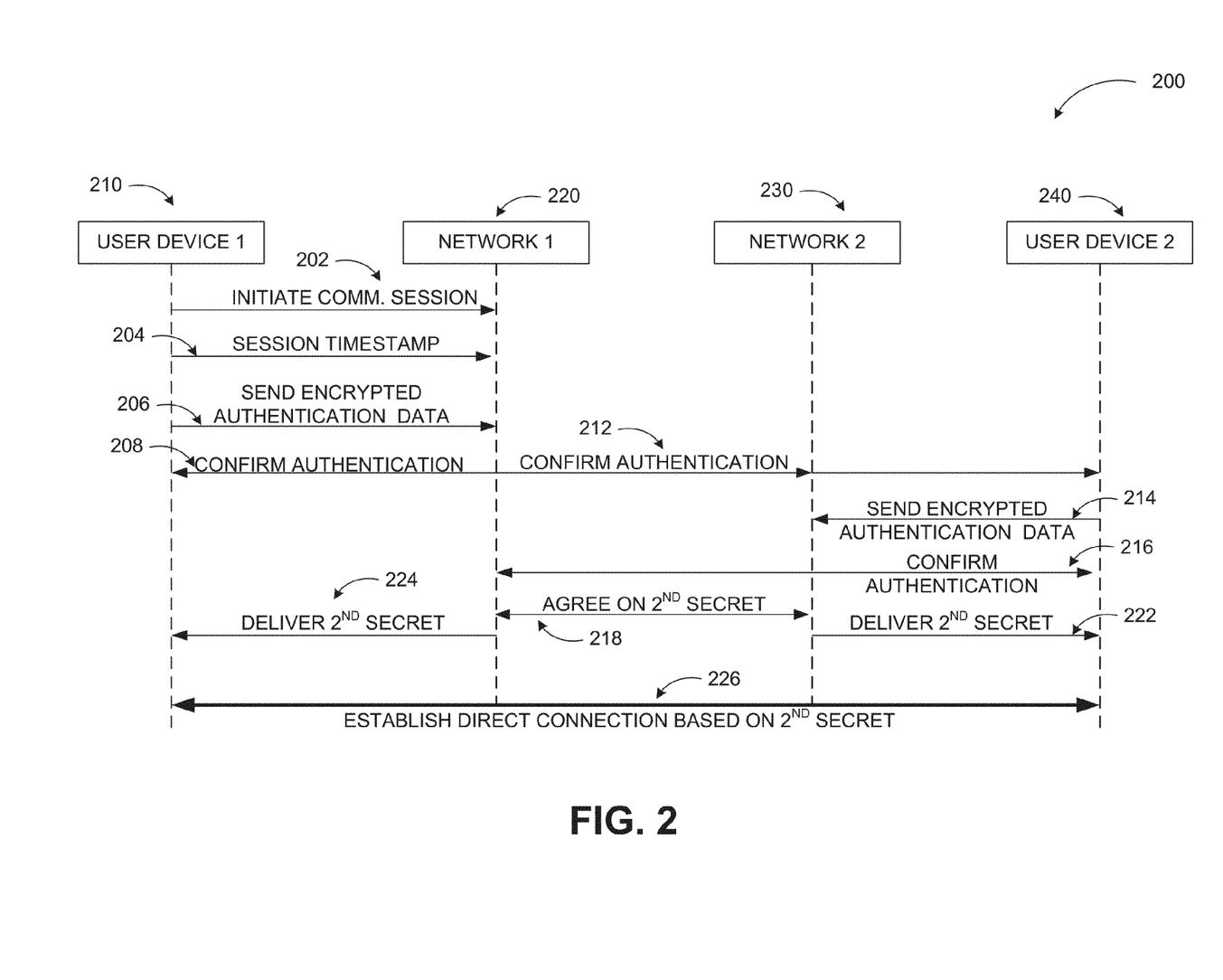
FIG. 2 illustrates an example scenario for establishing a secure connection between a first wireless device and a second wireless device.

FIG. 2 illustrates an example scenario for establishing a secure connection between a first wireless device and a second wireless device, arranged in accordance with at least some embodiments as described herein.

As illustrated in a diagram 200, a first user device 210 may desire to establish a secure communication session with a second user device 240 through a first network 220 and a second network 230. The first network 220 may be a service provider network associated with the first user device 210, and the second network 230 may be a service provider network associated with the second user device 240. The first and second networks (220, 230) may also include other networks such as a cellular network, a broadband network, a wireless local area network, a wide area network, and a wired network, for example. The secure communication session between the first user device 210 and the second user device 240 may be established over a wireless connection such as a private or public wireless network or near-field communication (e.g., Bluetooth). In order to establish the secure communication session, the first network 220 and the second network 230 may authenticate each of the first user device 210 and the second user device 240 employing admission and eviction records associated with each device.

In an example embodiment, the first user device 210 may initiate (202) a communication session request with the second user device 240. The request to initiate (202) the communication session may include encrypted authentication data 206 to authenticate the first user device 210 at the first network 220. The encrypted authentication data 206 may be handshake data encrypted with a first secret. The first user device 210 may synthesize the first secret based on admission and eviction records associated with the first user device 210. The synthesized first secret may be a hash of the admission and eviction records associated with the first user device 210, for example. The first user device 210 may encrypt the handshake data with the hash, and may send the encrypted handshake data along with a session timestamp 204 to the first network 220 for authentication. If the encrypted handshake data is intercepted by an unauthorized third party, the third party may be able to view the encrypted data. However, the third party may not be able to decrypt the data since the third party may have no way to determine the hash for lack of the unique admission and eviction records associated with the first user device 210.

In some cases, admission and eviction records may remain static for a period of time such as when the device does not power on/off or connect to a different tower or cell, which may cause vulnerability to replay attacks by unauthorized third parties. The session timestamp may be included with the encrypted authentication data 206 to address the vulnerability to replay attacks and to provide enhanced security and authentication by providing a one-time use hash. The session timestamp 204 may be a network timestamp of when the communication session is initiated and accepted by the first network 220. An example hash employed to encrypt the authentication data may be $E_{aer} \times \text{SessionTimestamp}$, where $E_{aer}$ is an extraction of admission and eviction records, SessionTimestamp is a session timestamp in unix time, and × is a mathematical or logical operation chosen to generate the hash.

In an example embodiment, the first network 220 may receive the encrypted authentication data 206 including the encrypted handshake data and the session timestamp 204 to authenticate the first user device 210. The first network 220 may also generate a hash from the first network's own copy of admission and eviction records associated with the first user device 210. The first network 220 may decrypt the encrypted authentication data 206 using the generated hash, and if the first network 220 successfully decrypts the encrypted authentication data 206, then the first user device 210 has been authenticated (208). Upon authentication of the first user device 210, the first network 220 may confirm (212) the authentication to the second network 230 associated with the second user device 240 via a secure connection established between the first network 220 and the second network 230.

The second network 230 may initiate a similar process with the second user device 240 to establish its own authentication of the second user device 240. For example, the second user device 240 may provide authentication data 214 to the second network 230 encrypted with a hash generated from admission and eviction records associated with the second user device 240. The second network 230 may confirm (216) the authentication of the second user device 240 by decrypting the authentication data employing the second network's 230 copy of admission and eviction records associated with the second user device 240.

In a system according to some embodiments, upon successful authentication of the second user device 240, the second network 230 may confirm the authentication to the first network 220. Upon confirmation of authentication of each of the devices between the first network 220 and the second network 230, the first network 220 and the second network 230 may agree upon a new shared secret 218. The new shared secret 218 may be any secret such as random ordered numbers. The new shared secret 218 may be agreed upon between the first network 220 and the second network 230 over a secure connection such as a secured inter or intra-datacenter link. Each of the first network 220 and the second network 230 may deliver (222, 224) the new shared secret 218 to the first user device 210 and the second user device 240 via individually secured connections. The individually secured connections may be connections previously secured between the devices and the networks. After receiving the new shared secret 218, the first user device 210 and the second user device 240 may establish a direct connection 226 based on the new shared secret 218. As illustrated in the diagram 200, no secrets may be shared over insecure links or channels in order to protect against unauthorized third party access. A direct connection secured by the shared secret may be established over between the first user device 210 and the second user device 240.

Figure 3:
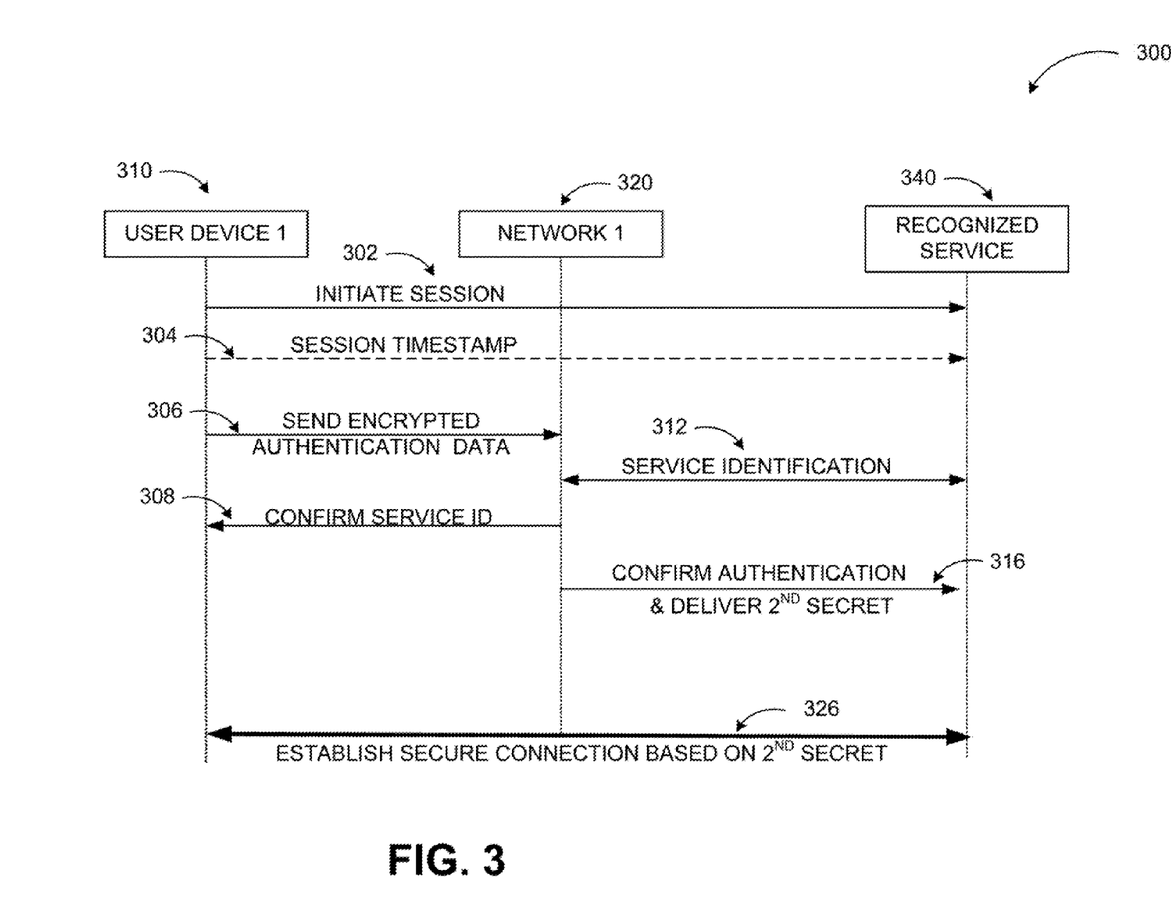
FIG. 3 illustrates a schematic for establishing a secure connection between a first wireless device and a recognized service.

FIG. 3 illustrates a schematic for establishing a secure connection between a first wireless device and a recognized service, arranged in accordance with at least some embodiments as described herein.

As illustrated in a diagram 300, a first user device 310 may initiate 302 a communication session to securely share data with a recognized service 340 such as a brokerage service, bank service, web service, or other recognized third party. In an example scenario, in order to securely share data between the first user device 310 and the recognized service 340, the first user device 310 may initiate the communication session with the recognized service 340. A network 320 associated with the first user device 310, such as a service provider network, may intercept the initiated communication session or be called upon to authenticate the first user device 310. The first user device 310 may be authenticated at the network 320 employing encrypted authentication data 306, as described above in conjunction with FIG. 2. The encrypted authentication data 306 may be handshake data encrypted with a first secret synthesized from admission and eviction records associated with the first user device 310. The first secret may be a hash generated from the admission and eviction records.

In an example embodiment, the encrypted authentication data 306 may also include a session timestamp 304 and service identification information to provide additional security. The service identification information may inform the network 320 of the identity of the recognized service the first user device 310 intends to communicate with. The service identification information may be a unique identifier provided by the recognized service to the first user device 310 and to the network 320, and the service identification information may be used to generate the hash. In another example embodiment, a multitude of recognized services may provide their unique identifiers to user devices and networks associated with the devices. The network may maintain a secure database of recognized service identifiers to provide additional security against unauthorized third party services that may pose as recognized services.

An example hash of the encrypted authentication data 306 including the session timestamp 304 and the service identification information may be $E_{aer} \times SessionTimestamp \times ServiceID$. $E_{aer}$ is an extraction of admission and eviction records, Session Timestamp is a session timestamp in unix time, ServiceID is unique service identification information, and × is a mathematical or logical operation chosen to generate the hash. The hash may be a unique, one-time use, and service specific hash for authenticating the recognized service 340 to establish a secure communication with the first user device 310. The network 320 may authenticate the first user device 310 by decrypting the received authentication data employing its own copy of admission and eviction records associated with the first user device 310.

In an example embodiment, upon receiving the encrypted authentication data 306 from the first user device, the network 320 may verify an identity 312 of the recognized service 340 employing the received service identification information. If the identity 312 of the recognized service 340 is not verified, then the network 320 may terminate the communication session between the first user device 310 and the recognized service 340. If the identity 312 of the recognized service 340 is verified, the network 320 may confirm (308) the service identification with the first user device 310. Upon verification of the identity of the recognized service 340, the network 320 may synthesize a second secret. The second secret may be a second hash synthesized from the admission and eviction records associated with the first user device 310, and the second hash may also include the session timestamp and the unique service ID as described above. The second secret may be delivered 316 over a secure inter-datacenter link to the recognized service 340. The first user device 310 may be able to compute the second secret from the information already stored locally at the first user device 310, such as the admission and eviction records, session timestamp, and the unique service ID. Once the first user device 310 and the recognized service 340 both have the second secret, the first user device 310 and the recognized service 340 may establish a secure connection 326 based on the second secret. In another embodiment the second secret may be any chain of data generated at network 320, the first user device 310, or recognized service 340 and propagated over the established secure links so that it is held by both the first user device 310 and recognized service 340.

In another example embodiment, the admission and eviction records stored locally at the first user device 310 may not match with admission and eviction records stored at the network 320. For example, factors such as lost records, failed transmission of records, or transmission delays may cause the admission and eviction records stored locally at the first user device 310 to not match with admission and eviction records stored at the network 320. To avoid a false rejection when authenticating a device at the network, the first secret may be synthesized from a given set of admission and eviction records. If a first set of admission and eviction records fail to authenticate the device, a secondary set of records may be selected, where the second set of records may have an earlier timestamp to eliminate issues related to transmission failure or delay. If the secondary set of records also do not authenticate the device, a third set may be used, and the process may be repeated using random timestamps as needed to achieve an acceptably low likelihood of failing to authenticate the device. Timing and number of timestamps or type of admission and eviction data may be varied to suit the circumstances.

Figure 4:
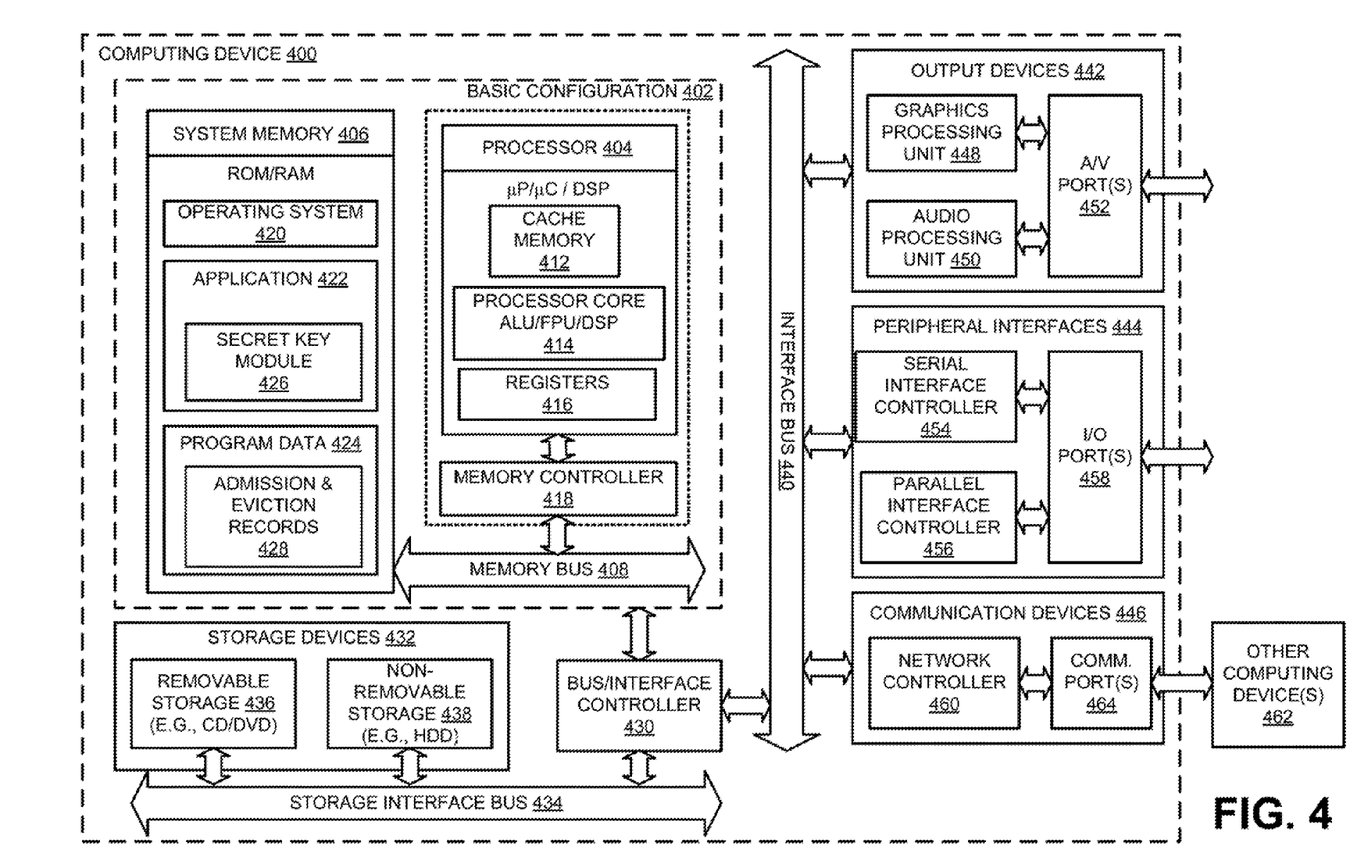
FIG. 4 illustrates a general purpose computing device, which may be used to establish a secure connection with a wireless device employing network records.

FIG. 4 illustrates a general purpose computing device, which may be used to establish a secure connection with a wireless device employing network records. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor ($\mu$P), a microcontroller ($\mu$C), a digital signal processor (DSP), or any combination thereof. The processor 404 may include one more levels of caching, such as a level cache memory 412, a processor core 414, and one or more registers 416. An example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include a secret key module 426 where admission and eviction records on a portable or wireless client device may act as a shared secret for secure data transmission to authenticate and secure connections between the client device and another client device and/or a recognized third party service as described herein. Program data 424 may include admission and eviction records 428, user identification data, recognized service identification data, and other similar data. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations. Moreover, the computing device 400 may be implemented as a networked system or as part of a general purpose or specialized server.

Example embodiments may also include methods to establish a secure connection between a wireless device and another device and/or recognized service using wireless device network records. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
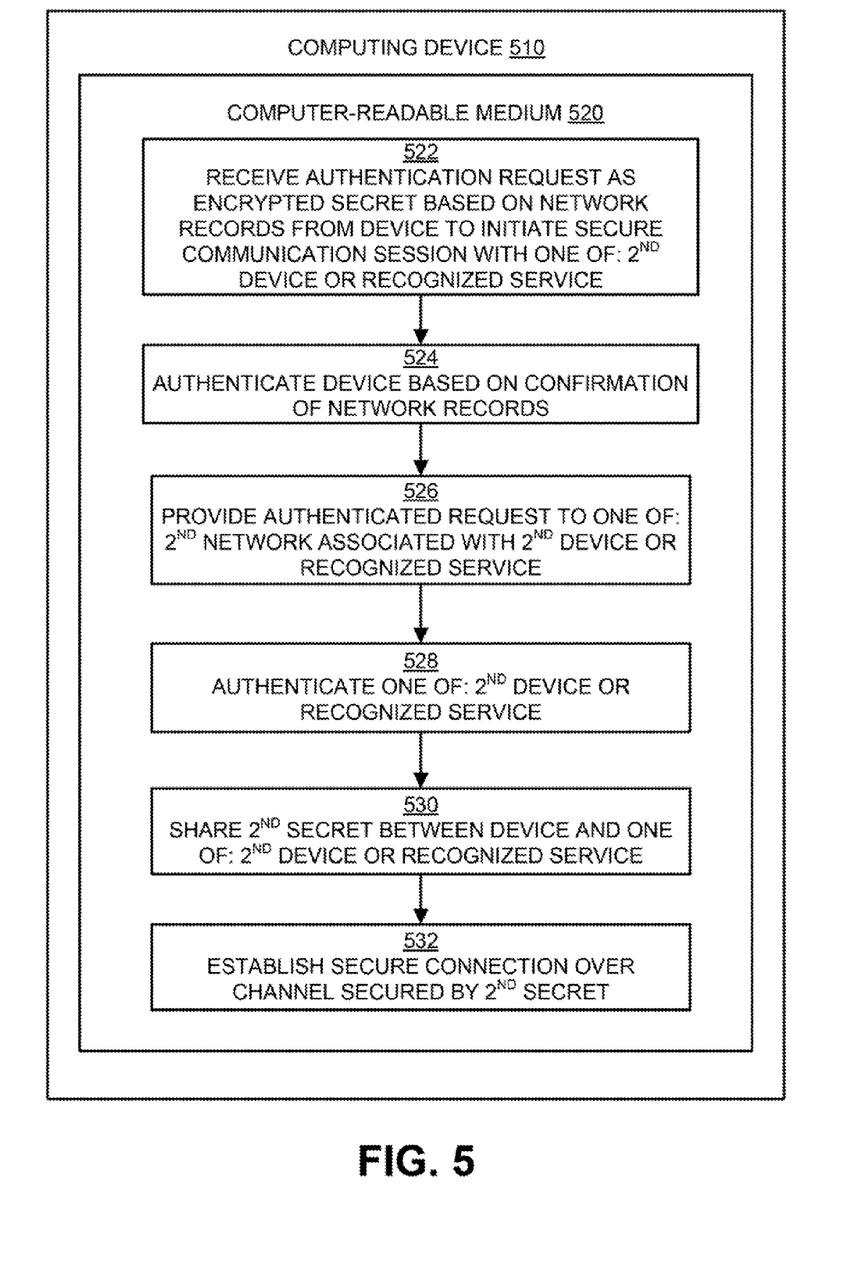
FIG. 5 is a flow diagram illustrating an example method that may be performed by a computing device such as the computing device in FIG. 4.

FIG. 5 is a flow diagram illustrating an example method that may be performed by a computing device such as the computing device in FIG. 4, arranged in accordance with at least some embodiments described herein.

Example methods may include one or more operations, functions or actions as illustrated by one or more of blocks 522, 524, 526, 528, 530, and/or 532. The operations described in blocks 522 through 532 may also be stored as computer-executable instructions in a computer-readable medium such as a computer-readable medium 520 of a computing device 510.

A process to establish a secure connection between a wireless device and another wireless device or recognized service using wireless device network records may begin with block 522, "RECEIVE AUTHENTICATION REQUEST AS ENCRYPTED SECRET BASED ON NETWORK RECORDS FROM DEVICE TO INITIATE SECURE COMMUNICATION SESSION WITH ONE OF: SECOND DEVICE OR RECOGNIZED SERVICE." At block 522, a service provider network associated with a first wireless device (for example, the first network 220) may receive an authentication request to initiate a communication session with another wireless device or with a third party recognized service. The authentication request may be encrypted authentication data, where the encrypted authentication data may include a first secret synthesized from network records associated with the first wireless device. The network records may include admission and eviction records associated with the first wireless device.

Block 522 may be followed by block 524, "AUTHENTICATE DEVICE BASED ON CONFIRMATION OF NETWORK RECORDS." At block 524, the service provider network (for example, the first network 220) may authenticate the first wireless device based on confirmation of the network records. The first wireless device may store a local copy of the device's own admission and eviction records at the device. The service provider network may store a database of admission and eviction records associated with a multitude of wireless devices associated with the service provider network. The service provider network may compare the admission and eviction records received in the encrypted authentication data from the first wireless device with the service provider network's admission and eviction records, and may authenticate the first wireless device.

Block 524 may be followed by block 526, "PROVIDE AUTHENTICATED REQUEST TO ONE OF: SECOND NETWORK ASSOCIATED WITH SECOND DEVICE OR RECOGNIZED SERVICE." At block 526, the service provider network may provide the authenticated request to another wireless device or to the third party recognized service. The authenticated request may be sent over a secure data-center channel to one of the recognized service or to another service provider network associated with the other wireless device.

Block 526 may be followed by block 528, "AUTHENTICATE ONE OF: SECOND DEVICE OR RECOGNIZED SERVICE." At block 528, the service provider network may authenticate the identity of the third party recognized service or the other wireless device. In the case of the third party recognized service, the service provider network may confirm the identity of the recognized service employing unique service identification information. In the case of another wireless device, the service provider network may authenticate the identity of the other wireless device with another service provider network associated with the other wireless device.

Block 528 may be followed by block 530, "SHARE SECOND SECRET BETWEEN DEVICE AND ONE OF: SECOND DEVICE OR RECOGNIZED SERVICE." Upon authentication of the recognized service or the other wireless device, the first service provider network may share a second secret with the recognized service or the other wireless device. The second secret may be a hash synthesized from the admission and eviction records associated with the first device, and may also include a session timestamp, and/or a unique service identifier. The second secret may be shared over a secure data-center channel to ensure security.

Block 530 may be followed by block 532, "ESTABLISH SECURE CONNECTION OVER CHANNEL SECURED BY SECOND SECRET." Once the first wireless device and the other wireless device or the recognized service each have the second shared secret, a secure direct connection may be established.

The blocks included in the above described process are for illustration purposes. Establishment of a secure connection for a wireless device using wireless device network records may be performed by similar processes with fewer or additional blocks. In some examples, the blocks may be performed in a different order. In some other examples, various blocks may be eliminated. In still other examples, various blocks may be divided into additional blocks, or combined together into fewer blocks. Although illustrated as sequentially ordered operations, in some implementations, the various operations may be performed in a different order, or in some cases various operations may be performed at substantially the same time.

Figure 6:
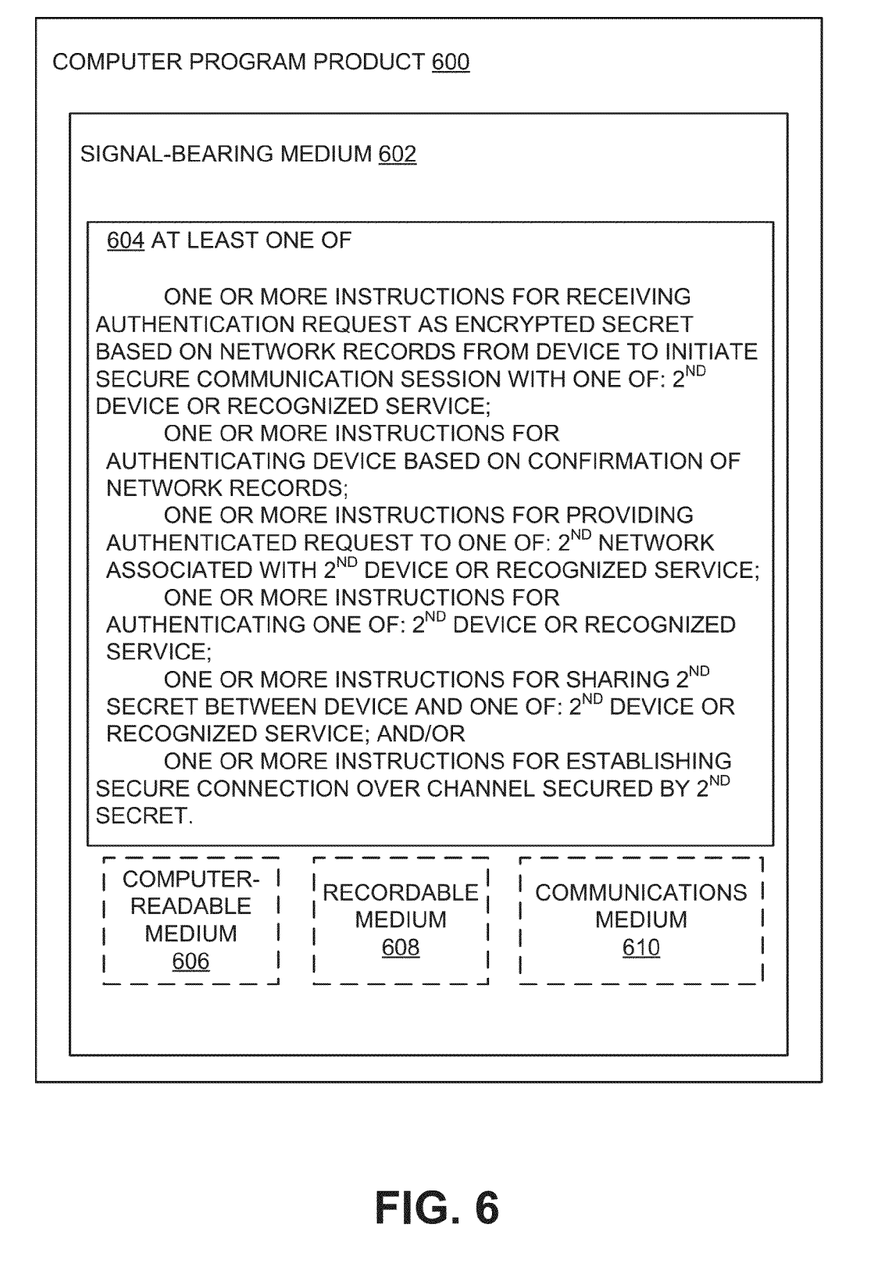
FIG. 6 illustrates a block diagram of an example computer program product, all arranged in accordance with at least some embodiments as described herein.

FIG. 6 illustrates a block diagram of an example computer program product, arranged in accordance with at least some embodiments described herein. In some examples, as shown in FIG. 6, a computer program product 600 may include a signal bearing medium 602 that may also include machine readable instructions 604 that, when executed by, for example, a processor, may provide the functionality described above with respect to FIG. 4 and FIG. 5. Thus, for example, referring to the processor 404, the secret key module 426 may undertake one or more of the tasks shown in FIG. 4 in response to instructions 604 conveyed to processor 404 by the signal bearing medium 602 to perform actions associated with establishment of a secure connection for a wireless device using network records as described herein. Some of those instructions may include receiving an authentication request as an encrypted secret based on network records from a device to initiate a secure communication session with one of: a second device or a recognized service, authenticating the device based on confirmation of the network records, providing an authenticated request to one of: a second network associated with a second device or a recognized service, sharing a second secret between the device and one of: the second device or the recognized service, and/or establishing a secure connection over a channel secured by the second secret.

In some implementations, the signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 may be conveyed by a wireless communications medium 610 (e.g., a wireless communications medium conforming with the IEEE 802.11 standard).

According to some examples, the present disclosure describes a method to establish a secure connection for a wireless device using wireless device network records. The method may include receiving, at a first network, an authentication request from a first device to initiate a communication session with a second device. The authentication request of the first device may be encrypted with a first secret synthesized by the first device based on one or more network records associated with the first device. The method may additionally include authenticating the first device based on a confirmation of the one or more network records and providing the authenticated request to a second network over a secure communication channel.

According to additional examples, the method may further include receiving an authenticated reply of the second device from the second network over the secure communication channel. In some examples, the method may additionally include agreeing on a second secret with the second network and establishing the requested communication session over a channel secured by the second secret.

According to some examples, the method may include receiving the authenticated reply of the second device from the second network, which may include receiving an authentication of the wireless device from the second network. The authentication of the wireless device may be based on receiving at the second network an encrypted secret based on one or more network records associated with the second device and authenticating the second device based on a confirmation of the one or more network records associated with the second device.

According to additional examples, the method may further include receiving the authentication request over an unsecured communication channel.

According to some examples, the unsecured communication channel may be one or more of: a near field communication link, a home wireless network, and a public wireless network.

According to further examples, at least one of the first and second devices may be a wireless device. According to some examples, the first and second networks of the method may be one of: a cellular network, a broadband network, a wireless local area network (WLAN), a wide area network (WAN), or a wired network.

According to different examples, the network records may include admission and eviction records for the first device. The admission and eviction records may include a record of connections between the first device with one or more base stations or cell towers in the first network during an initial connection and during a hand-off between two or more base stations or cell towers within the first network.

According to some examples, the method may further include causing the first device to store a local record of the admission and eviction records associated with the first device.

According to further examples, authenticating the first device of the method based on a confirmation of the one or more network records may further include decrypting the first secret and comparing the admission and eviction records associated with the first device with admission and eviction record received from at least one base station or cell tower within the first network.

According to some examples, the received authentication request with the first secret may include a hash generated at the first device based on the one or more network records including an encrypted handshake message.

According to different examples, the method may further include receiving a time stamp encrypted in the authentication request. According to some examples, the method may further include authenticating the first device by generating a hash based on the one or more network records and the time stamp and decrypting the authentication request using the generated hash.

According to some examples, the present disclosure may describe a method to establish a secure connection between a wireless device and a recognized service using wireless device network records. The method may include receiving, at a network, an authentication request from a device to initiate a communication session with a recognized service, wherein the authentication request is encrypted with a first secret synthesized by the device based on one or more network records associated with the device. The method may additionally include authenticating the device based on a confirmation of the one or more network records. The method may include authenticating an identity of the recognized service. The method may additionally include synthesizing a second secret based on the one or more network records. The method may include providing the second secret to the device and the recognized service over a secure communication channel and establishing the requested communication session between the device and the recognized service over a channel secured by the second secret.

According to different examples, the recognized service may include one of: a bank service, a brokerage service, or a web service hosting and providing private data.

According to some examples, the network of the method may include one of: a cellular network, a broadband network, a wireless local area network (WLAN), a wide area network (WAN), or a wired network.

According to some examples, the method may further include: receiving the authentication request over an unsecured communication channel.

According to different examples, the unsecured communication channel may be one or more of: a near field communication link, a home wireless network, and a public wireless network.

According to further examples, the network records may include admission and eviction records for the device. In some examples, the admission and eviction records may include a record of connections between the device with one or more base stations or cell towers in the network during an initial connection and during a hand-off between two or more base stations or cell towers within the network.

According to some examples, the method may further include causing the device to store a local record of the admission and eviction records associated with the device. According to further examples, the method may further include receiving the admission and eviction records from at least one base station or cell tower within the first network.

According to additional examples, authenticating the device based on a confirmation of the one or more network records may further includes decrypting the first secret and comparing the admission and eviction records associated with the device with admission and eviction record received from the at least one base station or cell tower within the network.

According to different examples, the received authentication request with the first secret may be a hash including an encrypted handshake message generated at the device based on the one or more network records.

According to further examples, the method may further include receiving a time stamp in the authentication request. The method may additionally include receiving a unique identifier for the recognized service in the authentication request. According to some examples, the method may further include authenticating the device and the identity of the recognized service by generating a hash based on the one or more network records, the time stamp, and the unique identifier for the recognized service and decrypting the authentication request using the generated hash.

According to some examples, in response to determining that the identity of the recognized service may not be authenticated, the method may include terminating the communication session between the device and the recognized service.

According to some examples, synthesizing the second secret may include generating a hash based on the based on the one or more network records, the time stamp, and the unique identifier for the recognized service.

According to some examples, the present disclosure may describe a system to establish a secure connection for a wireless device using wireless device network records. The system may include a plurality of base stations of cell towers and a controller of a first network. The controller may be configured to receive an authentication request from a first device to initiate a communication session with a second device. The authentication request may be encrypted with a first secret synthesized by the first device based on one or more network records associated with the first device. The controller may additionally be configured to authenticate the first device based on a confirmation of the one or more network records and provide the authenticated request to a second network associated with the second device over a secure communication channel. The controller may be configured to receive an authenticated reply of the second device from the second network over the secure communication channel and agree on a second secret with the second network. The controller may be configured to establish the requested communication session between the first device and the second device over a channel secured by the second secret.

According to some examples, at least one of the first and second devices may include a wireless device. In some examples, the first and second networks may include one of: a cellular network, a broadband network, a wireless local area network (WLAN), a wide area network (WAN), or a wired network.

According to additional examples, the authenticated reply of the second device from the second network may include an authentication of the second device based on receiving, at the second network, an encrypted secret based on one or more network records associated with the second device and authenticating the second device based on a confirmation of the one or more network records associated with the second device.

According to further examples, the controller may be further configured to receive the authentication request over an unsecured communication channel. According to some examples, the unsecured communication channel may be one or more of: a near field communication link, a home wireless network, and a public wireless network.

According to some examples, the network records may be admission and eviction records for the first device. According to further examples, the admission and eviction records may include a record of connections between the first device with one or more base stations or cell towers in the first network during an initial connection and during a hand-off between two or more base stations or cell towers within the first network.

According to different examples, the controller may be configured to cause the first device to store a local record of the admission and eviction records associated with the first device. According to some examples, the controller may be further configured to receive the admission and eviction records from at least one base station or cell tower within the first network.

According to further examples, the controller may be configured to decrypt the first secret and compare the admission and eviction records associated with the first device with admission and eviction record received from the at least one base station or cell tower within the first network.

According to some examples, the received authentication request with the first secret may include a hash generated at the first device based on the one or more network records including an encrypted handshake message.

According to different examples, the controller may be further configured to receive a time stamp encrypted in the authentication request. According to some examples, the controller may be further configured to authenticate the first device by generating a hash based on the one or more network records and the time stamp and decrypt the authentication request using the generated hash.

According to some examples, the present disclosure may describe a system to establish a secure connection between a wireless device and a recognized service using wireless device network records. The system may include a plurality of base stations or cell towers and a controller of a network associated with a device. The controller may be configured to receive an authentication request from the device to initiate a communication session with a recognized service. The authentication request may be encrypted with a first secret synthesized by the device based on one or more network records associated with the device. The controller may be further configured to authenticate the device based on a confirmation of the one or more network records and authenticate an identity of the recognized service. The controller may be further configured to synthesize a second secret based on the one or more network records and provide the second secret to the device and the recognized service over a secure communication channel. The controller may additionally be further configured to establish the requested communication session between the device and the recognized service over a channel secured by the second secret.

According to some examples, the recognized service may include one of: a bank service, a brokerage service, or a web service hosting and providing private data. According to additional examples, the network may include one of: a cellular network, a broadband network, a wireless local area network (WLAN), a wide area network (WAN), or a wired network.

According to further examples, the controller may be further configured to receive the authentication request over an unsecured communication channel. According to some examples, the unsecured communication channel may include one or more of: a near field communication link, a home wireless network, and a public wireless network.

According to some examples, the network records may include admission and eviction records for the device. According to some examples, the admission and eviction records may include a record of connections between the device with one or more cell towers in the network during an initial connection and during a hand-off between two or more cell towers within the network.

According to some examples, the controller may be configured to receive the admission and eviction records from at least one base station or cell tower within the network. According to further examples, the controller may be further configured to decrypt the first secret and compare the admission and eviction records associated with the device with admission and eviction record received from at least one base station or cell tower within the network.

According to further examples, the received authentication request with the first secret may include a hash including an encrypted handshake message generated at the device based on the one or more network records.

According to some examples, the controller may be further configured to receive a time stamp in the authentication request. According to further examples, the controller may be further configured to receive a unique identifier for the recognized service in the authentication request. According to additional examples, the controller may be further configured to authenticate the device and the identity of the recognized service by generating a hash based on the one or more network records, the time stamp, and the unique identifier for the recognized service and decrypt the authentication request using the generated hash.

According to some examples, the controller may be further configured to in response to a determination that the identity of the recognized service may not be authenticated, terminate the communication session between the device and the recognized service.

According to different examples, the second secret may be synthesized by generating a hash based on the based on the one or more network records, the time stamp, and the unique identifier for the recognized service.

There is little distinction left between hardware and software implementations of aspects of systems; the use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (for example, hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be well within the skill of one of skill in the art in light of the present disclosure.

The present disclosure is not to be limited in terms of the particular examples described in the present application, which may be intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations may be intended to fall within the scope of the appended claims. The present disclosure is to be limited only by the terms of the appended claims, along with the full scope of equivalents to which such claims may be entitled. It is to be understood that the present disclosure is not limited to particular methods, reagents, compounds compositions or biological systems, which can, of course, vary. It is also to be understood that the terminology used herein is for the purpose of describing particular examples only, and is not intended to be limiting.

In addition, those skilled in the art will appreciate that the mechanisms of the subject matter described herein may be capable of being distributed as a program product in a variety of forms, and that an illustrative example of the subject matter described herein applies regardless of the particular type of signal bearing medium used to actually carry out the distribution. Examples of a signal bearing medium include, but may not be limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented using any suitable commercially available components, such as those found in data computing/communication and/or network computing/communication systems. The herein described subject matter sometimes illustrates different components coupled within, or coupled with, different other components. It is to be understood that such depicted architectures may not be merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but may not be limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (fir example, bodies of the appended claims) may not be generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various compositions, methods, systems, and devices may be described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein may be for purposes of illustration and may not be intended to be limiting, with the true scope and spirit being indicated by the following claims.

What is claimed is:

1. A method to establish a secure communication channel for a wireless device using one or more network records of the wireless device, the method comprising:
   receiving, at a first network, an authentication request from a first device to initiate a communication session with a second device,
      wherein the authentication request includes a time stamp and is encrypted with a first secret synthesized by the first device based on the one or more network records associated with the first device, and
      wherein the one or more network records associated with the first device include admission and eviction records that are generated based on a record of an antenna orientation during a prior connection between the first device and one or more base stations or one or more cell towers in the first network;
   authenticating the first device by generating a hash based on the admission and eviction records and the time stamp;
   providing the authenticated request to a second network over the secure communication channel; and
   decrypting the authentication request using the generated hash.

2. The method according to claim 1, further comprising:
   receiving an authenticated reply of the second device from the second network over the secure communication channel;
   agreeing on a second secret with the second network; and
   establishing the communication session over another secure communication channel that is secured by the second secret.

3. The method according to claim 2, wherein receiving the authenticated reply of the second device from the second network further includes:
   receiving an authentication of the wireless device from the second network, wherein the authentication of the wireless device is based on:

receiving, at the second network, an encrypted secret, wherein the encrypted secret is based on one or more network records associated with the second device; and authenticating the second device in response to a confirmation of the one or more network records associated with the second device.

4. The method according to claim 1, wherein the admission and eviction records further include another record of another connection identified during a hand-off between two or more base stations or two or more cell towers within the first network.

5. The method according to claim 1, further comprising: causing the first device to store a local record of the admission and eviction records associated with the first device.

6. The method according to claim 1, further comprising: authenticating the first device in response to a confirmation of the admission and eviction records by:
decrypting the first secret; and
comparing the admission and eviction records associated with the first device with additional admission and eviction records received from at least one base station of the one or more base stations or at least one cell tower of the one or more cell towers within the first network.

7. The method according to claim 1, wherein the authentication request is a hash generated at the first device based on the admission and eviction records that include an encrypted handshake message.

8. A method to establish a secure communication channel between a wireless device and a recognized service using one or more network records of the wireless device, the method comprising:
receiving, at a network, an authentication request from the wireless device to initiate a communication session with the recognized service,
wherein the authentication request includes a time stamp and a unique identifier for the recognized service,
wherein the authentication request is encrypted with a first secret synthesized by the wireless device based on one or more network records associated with the wireless device, and
wherein the one or more network records associated with the wireless device include admission and eviction records that are generated based on a record of an antenna orientation during a prior connection between the wireless device and one or more base stations or one or more cell towers in the network;
authenticating the wireless device based on a confirmation of the admission and eviction records;
authenticating an identity of the recognized service;
synthesizing a second secret based on the one or more admission and eviction records by a process that generates a hash, and wherein the hash is based on the one or more admission and eviction records, the time stamp, and the unique identifier for the recognized service;
providing the second secret to the wireless device and the recognized service over a secure communication channel; and
establishing the communication session between the wireless device and the recognized service over another secure communication channel that is secured by the second secret.

9. The method according to claim 8, wherein the admission and eviction records further include another record of another connection identified during a hand-off between two or more base stations or two or more cell towers within the network.

10. The method according to claim 9, further comprising: causing the wireless device to store a local record of the admission and eviction records associated with the wireless device.

11. The method according to claim 10, further comprising: receiving the admission and eviction records from at least one base station of the one or more base stations or at least one cell tower of the one or more cell towers within the network.

12. The method according to claim 11, wherein authenticating the wireless device based on the confirmation of the admission and eviction records further includes:
decrypting the first secret; and
comparing the admission and eviction records associated with the wireless device with additional admission and eviction records received from at least one base station of the one or more base stations or at least one cell tower of the one or more cell towers within the network.

13. The method according to claim 8, further comprising: authenticating the wireless device and the identity of the recognized service through a process to generate the hash, wherein the hash is based on the admission and eviction records, the time stamp, and the unique identifier for the recognized service; and
decrypting the authentication request using the hash.

14. The method according to claim 13, further comprising: in response to a determination that the identity of the recognized service is not authenticated, terminating the communication session between the wireless device and the recognized service.

15. A system to establish a secure communication channel for a wireless device using one or more network records of the wireless device, the system comprising:
base stations that are associated with cell towers; and
a controller of a first network, wherein the controller is configured to:
receive an authentication request from a first device to initiate a communication session with a second device,
wherein the authentication request is encrypted with a first secret synthesized by the first device and is based on one or more network records associated with the first device, and
wherein the one or more network records associated with the first device include admission and eviction records that are generated based on a record of an antenna orientation during a prior connection between the first device and the base stations in the first network;
authenticate the first device based on a confirmation of the admission and eviction records;
provide the authenticated request to a second network associated with the second device over the secure communication channel;
receive an authenticated reply of the second device from the second network over the secure communication channel;
agree on a second secret with the second network; and
establish the communication session between the first device and the second device over another secure communication channel that is secured by the second secret, wherein at least one of the first device or the second device is a wireless device.

16. The system according to claim 15, wherein the authenticated reply of the second device from the second network includes an authentication of the second device based on:

receiving, at the second network, an encrypted secret based on the admission and eviction records associated with the second device; and authenticating the second device based on a confirmation of the admission and eviction records associated with the second device.

17. The system according to claim 15, wherein the admission and eviction records further include another record of another connection identified during a hand-off between two or more base stations of the base stations or two or more cell towers of the cell towers within the first network.

18. The system according to claim 17, wherein the controller is further configured to:

cause the first device to store a local record of the admission and eviction records associated with the first device.

19. The system according to claim 18, wherein the controller is further configured to:

receive the admission and eviction records from at least one base station of the base stations or at least one cell tower of the cell towers within the first network.

20. The system according to claim 19, wherein the controller is further configured to:

decrypt the first secret; and compare the admission and eviction records associated with the first device with additional admission and eviction records received from at least one base station of the base stations or at least one cell tower of the cell towers within the first network.

* * * * *